US010816201B2

(12) United States Patent
Drake

(10) Patent No.: US 10,816,201 B2
(45) Date of Patent: Oct. 27, 2020

(54) SEALED COMBUSTOR LINER PANEL FOR A GAS TURBINE ENGINE

(71) Applicant: United Technologies Corporation, Hartford, CT (US)

(72) Inventor: Christopher Drake, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 976 days.

(21) Appl. No.: 14/913,165

(22) PCT Filed: Jul. 11, 2014

(86) PCT No.: PCT/US2014/046381
§ 371 (c)(1),
(2) Date: Feb. 19, 2016

(87) PCT Pub. No.: WO2015/038232
PCT Pub. Date: Mar. 19, 2015

(65) Prior Publication Data
US 2016/0201914 A1    Jul. 14, 2016

Related U.S. Application Data

(60) Provisional application No. 61/877,728, filed on Sep. 13, 2013.

(51) Int. Cl.
*F02C 7/28* (2006.01)
*F23R 3/06* (2006.01)
(Continued)

(52) U.S. Cl.
CPC ............... *F23R 3/06* (2013.01); *F02C 7/18* (2013.01); *F02C 7/24* (2013.01); *F02C 7/28* (2013.01);
(Continued)

(58) Field of Classification Search
CPC ................... F23R 2900/00012; F23R 3/002
See application file for complete search history.

(56) References Cited

U.S. PATENT DOCUMENTS 4,253,301 A * 3/1981 Vogt .................... F23R 3/002
60/39.463
4,302,941 A * 12/1981 DuBell ................... F23R 3/06
60/757
(Continued)

FOREIGN PATENT DOCUMENTS

DE       102005046731 A1    11/2006
EP           1022437 A1 *  7/2000   ........... F01D 11/005
(Continued)

OTHER PUBLICATIONS

Arthur H. Lefebvre, Dilip R. Ballal, 2010, GAS Turbine Combustion, CRC Press, Taylor & Francis Group, Third Edition, p. 14. (Year: 2010).*
(Continued)

*Primary Examiner* — Gerald L Sung
*Assistant Examiner* — Marc J Amar
(74) *Attorney, Agent, or Firm* — Getz Balich LLP

(57) ABSTRACT

A liner panel for a combustor of a gas turbine engine includes a rail which at least partially defines an impingement cavity. The rail includes a notch which faces toward the impingement cavity. A method of cooling a wall assembly within a combustor for of a gas turbine engine includes directing air through a support shell and a liner panel to form a pressure drop across the support shell that is less than about 80% of a pressure drop across the combustor and to also form a pressure drop across the liner panel greater than about 20% of the pressure drop across the combustor.

9 Claims, 7 Drawing Sheets

(51) Int. Cl.
  *F02C 7/18* (2006.01)
  *F02C 7/24* (2006.01)
  *F23R 3/00* (2006.01)
  *F23R 3/60* (2006.01)
  *F23R 3/50* (2006.01)

(52) U.S. Cl.
  CPC ............. *F23R 3/002* (2013.01); *F23R 3/005* (2013.01); *F23R 3/50* (2013.01); *F23R 3/60* (2013.01); *F23R 2900/00012* (2013.01); *F23R 2900/00017* (2013.01); *F23R 2900/03041* (2013.01); *F23R 2900/03042* (2013.01); *F23R 2900/03044* (2013.01); *F23R 2900/03045* (2013.01); *Y02T 50/675* (2013.01)

(56) References Cited

U.S. PATENT DOCUMENTS

| | | | | |
|---|---|---|---|---|
| 4,628,694 | A * | 12/1986 | Kelm | B21D 35/00 60/752 |
| 4,749,298 | A * | 6/1988 | Bundt | F02K 1/82 403/23 |
| 4,805,397 | A * | 2/1989 | Barbier | F23R 3/06 60/800 |
| 5,079,915 | A * | 1/1992 | Veau | F02K 1/822 60/753 |
| 5,363,643 | A * | 11/1994 | Halila | F23R 3/002 60/752 |
| 5,467,592 | A * | 11/1995 | Carletti | F02K 1/80 403/393 |
| 5,630,319 | A * | 5/1997 | Schilling | F23R 3/10 60/747 |
| 5,758,503 | A | 6/1998 | Dubell et al. | |
| 5,974,805 | A | 11/1999 | Allen | |
| 6,148,600 | A | 11/2000 | Farmer et al. | |
| 6,470,685 | B2 * | 10/2002 | Pidcock | F23R 3/002 60/752 |
| 6,655,146 | B2 | 12/2003 | Kutter et al. | |
| 6,701,714 | B2 * | 3/2004 | Burd | F23M 5/02 60/752 |
| 6,792,757 | B2 | 9/2004 | Borns et al. | |
| 6,840,047 | B2 * | 1/2005 | Schmahl | F23R 3/002 60/753 |
| 6,901,757 | B2 * | 6/2005 | Gerendas | F23M 5/00 110/336 |
| 6,957,538 | B2 | 10/2005 | Tiemann | |
| 7,010,921 | B2 | 3/2006 | Intile et al. | |
| 7,021,061 | B2 * | 4/2006 | Tiemann | F23M 5/00 110/336 |
| 7,140,185 | B2 * | 11/2006 | Burd | F23M 5/085 60/752 |
| 7,155,913 | B2 | 1/2007 | Beule et al. | |
| 7,260,936 | B2 | 8/2007 | Patel et al. | |
| 7,373,778 | B2 | 5/2008 | Bunker et al. | |
| 7,681,398 | B2 | 3/2010 | Patel et al. | |
| 7,721,548 | B2 | 5/2010 | Patel et al. | |
| 7,748,221 | B2 | 7/2010 | Patel et al. | |
| 7,770,397 | B2 | 8/2010 | Patel et al. | |
| 7,849,694 | B2 * | 12/2010 | Dahlke | F23M 5/02 60/752 |
| 8,096,134 | B2 | 1/2012 | Hernandez et al. | |
| 8,156,744 | B2 | 4/2012 | Hernandez et al. | |
| 8,359,866 | B2 * | 1/2013 | Dierberger | F23M 5/02 60/752 |
| 8,408,557 | B2 * | 4/2013 | Taylor | F23R 3/002 60/39.463 |
| 8,448,416 | B2 | 5/2013 | Davis, Jr. et al. | |
| 8,529,204 | B2 * | 9/2013 | Bagnall | B21D 35/00 60/752 |
| 8,695,989 | B2 * | 4/2014 | Dahlke | F02K 1/822 60/753 |
| 9,534,785 | B2 * | 1/2017 | Davenport | F23R 3/10 60/747 |
| 9,765,698 | B2 * | 9/2017 | Bennett | F01D 11/006 415/174.5 |
| 2001/0029738 | A1 * | 10/2001 | Pidcock | F23R 3/002 60/754 |
| 2003/0079475 | A1 * | 5/2003 | Schmahl | F23R 3/002 60/752 |
| 2003/0089115 | A1 * | 5/2003 | Gerendas | F23M 5/00 60/796 |
| 2003/0101731 | A1 * | 6/2003 | Burd | F23M 5/02 60/796 |
| 2004/0206087 | A1 * | 10/2004 | Tiemann | F23M 5/00 60/752 |
| 2004/0211188 | A1 * | 10/2004 | Alkabie | F23R 3/002 60/772 |
| 2005/0242525 | A1 * | 11/2005 | Dahlke | F23M 5/02 277/605 |
| 2006/0005543 | A1 * | 1/2006 | Burd | F23M 5/085 60/752 |
| 2007/0245742 | A1 | 10/2007 | Dahlke et al. | |
| 2009/0077974 | A1 * | 3/2009 | Dahlke | F23M 5/02 60/752 |
| 2009/0214354 | A1 * | 8/2009 | Bagnall | F01D 5/066 416/245 R |
| 2009/0308077 | A1 * | 12/2009 | Shelley | F23R 3/06 60/752 |
| 2010/0095680 | A1 | 4/2010 | Rudrapatna et al. | |
| 2010/0276895 | A1 * | 11/2010 | Taylor | F16J 15/062 277/608 |
| 2011/0135451 | A1 | 6/2011 | Tschuor et al. | |
| 2011/0185737 | A1 * | 8/2011 | Dierberger | F23M 5/02 60/752 |
| 2012/0121408 | A1 | 5/2012 | Lee et al. | |
| 2012/0195743 | A1 * | 8/2012 | Walunj | F01D 11/006 415/174.5 |
| 2013/0340437 | A1 * | 12/2013 | Erbas-Sen | F23R 3/06 60/754 |
| 2014/0352323 | A1 * | 12/2014 | Bennett | F23R 3/002 60/752 |
| 2015/0260401 | A1 * | 9/2015 | Gerend S | F23R 3/002 60/752 |
| 2016/0061448 | A1 * | 3/2016 | Davenport | F02K 1/80 403/393 |

FOREIGN PATENT DOCUMENTS

| | | | | |
|---|---|---|---|---|
| EP | | 1378690 A2 | 1/2004 | |
| EP | | 1507116 A1 * | 2/2005 | ............. F23R 3/002 |
| GB | | 2298266 A * | 8/1996 | ............. F23R 3/002 |
| GB | | 2361304 A * | 10/2001 | ............. F23R 3/002 |
| WO | WO-2006111508 A1 * | | 10/2006 | ............. F23M 5/00 |

OTHER PUBLICATIONS

EP search report for EP14843958.1 dated Sep. 5, 2016.

* cited by examiner

SEALED COMBUSTOR LINER PANEL FOR A GAS TURBINE ENGINE

CROSS-REFERENCE TO RELATED APPLICATION

This application claims priority to PCT Patent Application No. PCT/US2014/046381 filed Jul. 11, 2014, which claims priority to U.S. Provisional Application No. 61/877,728 filed Sep. 13, 2013, which are hereby incorporated herein by reference in their entireties.

STATEMENT REGARDING FEDERALLY SPONSORED RESEARCH OR DEVELOPMENT

This disclosure was made with Government support under FA8650-09-D-2923 0021 awarded by the United States Air Force. The Government may have certain rights in this disclosure.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Advanced engine cycles require the combustor section to operate at high compressor exit temperatures. A survey of typical flight envelopes often require that high compressor exit temperatures exist with reduced supply pressure at high altitude. These operational conditions may result in relatively high convection and radiation heat loads.

SUMMARY

A liner panel for a combustor of a gas turbine engine, according to one disclosed non-limiting embodiment of the present disclosure, includes a rail which at least partially defines an impingement cavity. The rail includes a notch which faces toward the impingement cavity.

In a further embodiment of the present disclosure, a seal is included at least partially within the notch.

In a further embodiment of any of the foregoing embodiments of the present disclosure, the rail surrounds the impingement cavity.

In a further embodiment of any of the foregoing embodiments of the present disclosure, the seal surrounds the impingement cavity.

In a further embodiment of any of the foregoing embodiments of the present disclosure, the seal is a C-seal.

In a further embodiment of any of the foregoing embodiments of the present disclosure, an opening of the C-seal is directed toward the impingement cavity.

In a further embodiment of any of the foregoing embodiments of the present disclosure, a multiple of effusion flow passages are included though the liner panel.

In a further embodiment of any of the foregoing embodiments of the present disclosure, a multiple of studs are included. The studs extend from a cold side of the liner panel.

In a further embodiment of any of the foregoing embodiments of the present disclosure, the rail extends from a cold side of the liner panel.

A combustor of a gas turbine engine, according to another disclosed non-limiting embodiment of the present disclosure, includes a shell with a multiple of impingement flow passages. The combustor also includes a liner panel mounted to the shell and a seal within the notch. The liner panel includes a rail which interfaces with the shell to define an impingement cavity therebetween. The rail includes a notch which faces toward the impingement cavity.

In a further embodiment of any of the foregoing embodiments of the present disclosure, a plurality of studs are included which extend from a cold side of the liner panel, the studs extend through the shell.

In a further embodiment of any of the foregoing embodiments of the present disclosure, the rail includes an interface surface at least partially in contact with the shell.

In a further embodiment of any of the foregoing embodiments of the present disclosure, the seal is a C-seal.

In a further embodiment of any of the foregoing embodiments of the present disclosure, an opening of the C-seal is directed toward the impingement cavity.

In a further embodiment of any of the foregoing embodiments of the present disclosure, a multiple of effusion flow passages are included though the liner panel.

In a further embodiment of any of the foregoing embodiments of the present disclosure, a multiple of impingement flow passages are included though the support shell.

A method of cooling a wall assembly within a combustor of a gas turbine engine, according to another disclosed non-limiting embodiment of the present disclosure, includes directing air through a support shell and a liner panel to form a pressure drop across the support shell that is less than about 80% of a pressure drop across the combustor and a pressure drop across the liner panel greater than about 20% of the pressure drop across the combustor.

In a further embodiment of any of the foregoing embodiments of the present disclosure, the method also includes sealing the interface between the support shell and at least one of the multiple of liner panels.

In a further embodiment of any of the foregoing embodiments of the present disclosure, the method also includes compressing the seal between the support shell and the liner panel.

In a further embodiment of any of the foregoing embodiments of the present disclosure, the method also includes pressurizing the seal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
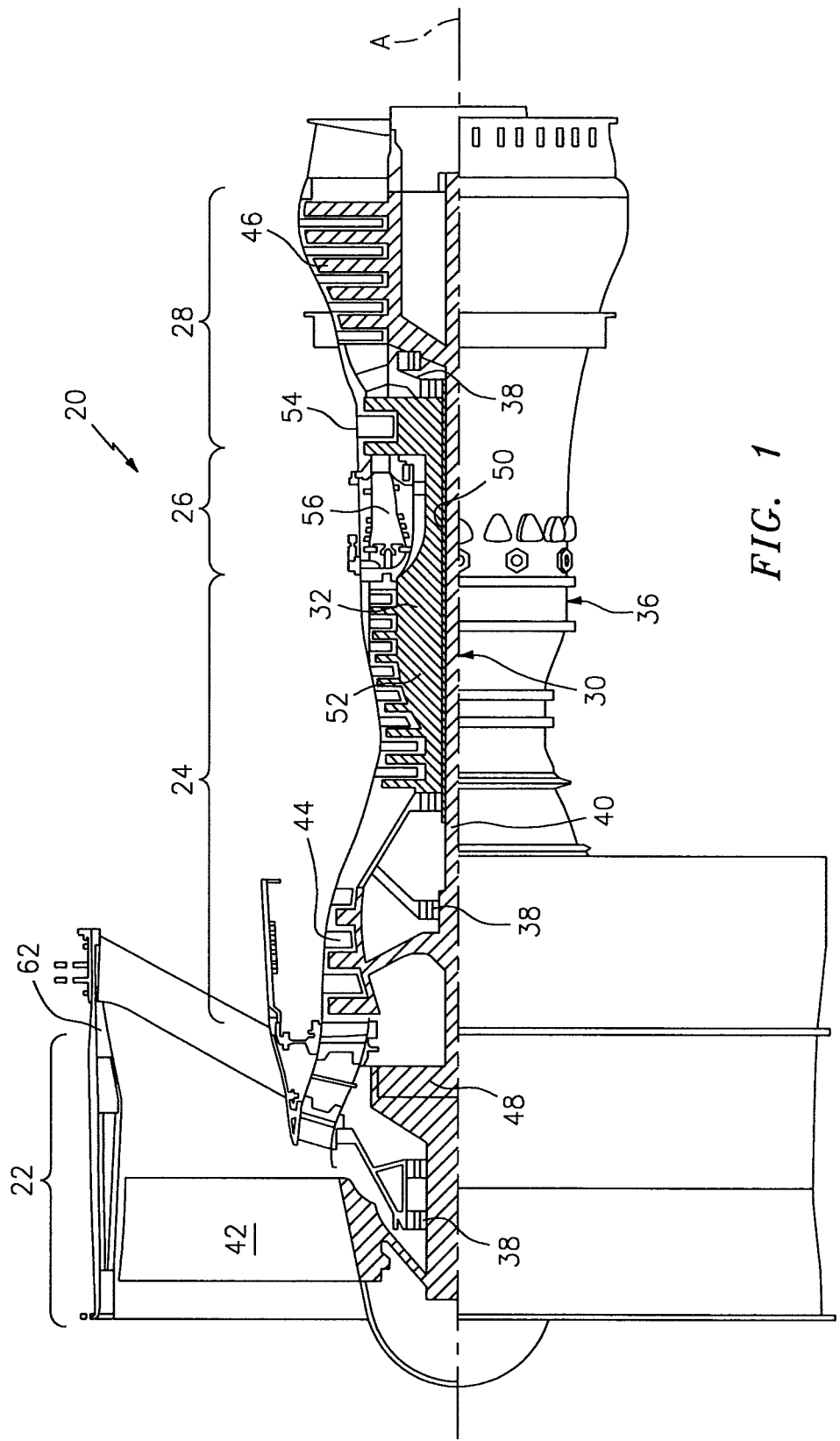
FIG. 1 is a schematic cross-section of an example gas turbine engine architecture.
Figure 2:
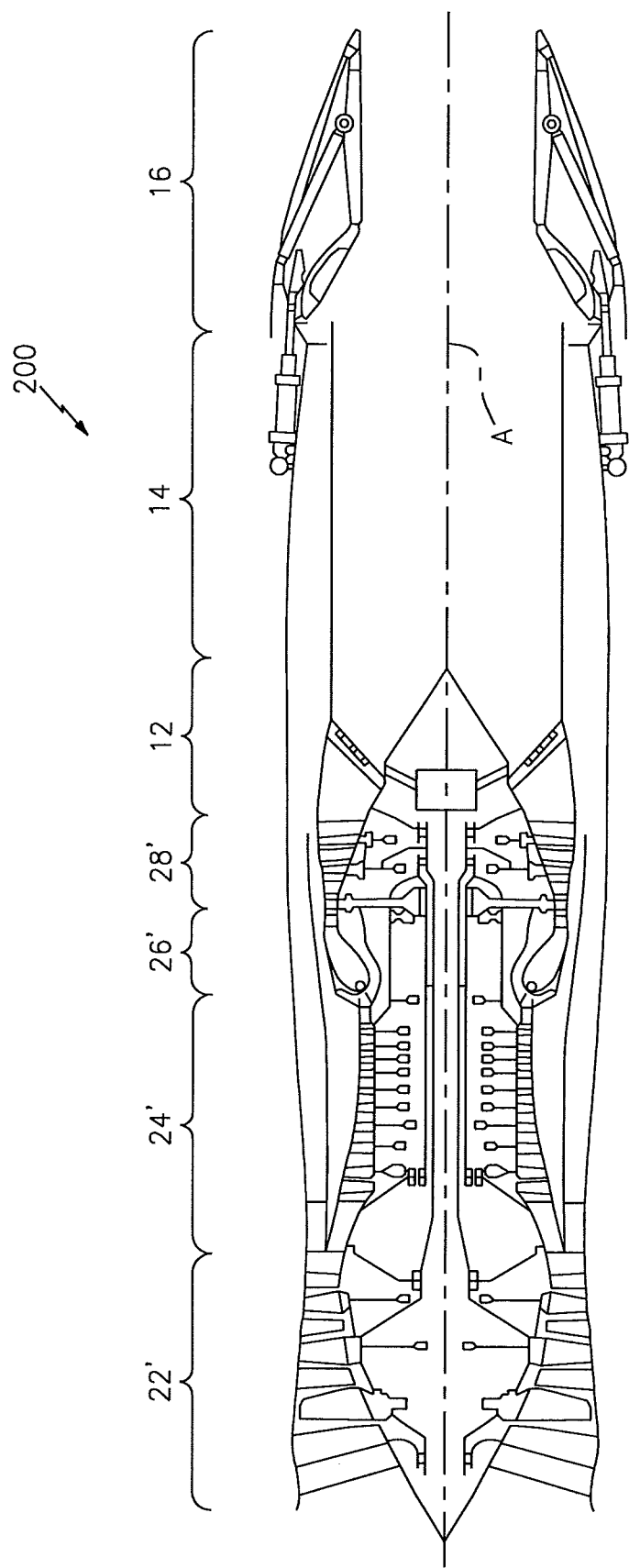
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Another alternative engine architecture 200 might include an augmentor section 12, an exhaust duct section 14 and a nozzle section 16 in addition to the fan section 22', compressor section 24', combustor section 26' and turbine section 28' (see FIG. 2). Although depicted as an aero engine in the disclosed non-limiting embodiment, it should be understood that the concepts described herein are not so limited and the teachings may be applied to other types of turbine engines such as a turbojets, turboshafts, and three-spool (plus fan) turbofans with an intermediate spool.

The fan section 22 drives air along a bypass flowpath and into the compressor section 24. The compressor section 24 drives air along a core flowpath for compression and communication into the combustor section 26, which then expands and directs the air through the turbine section 28. The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing structures 38 within the static structure 36.

In one non-limiting example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example, is greater than about 2.5:1. The geared turbofan enables operation of the low spool 30 at higher speeds which can increase the operational efficiency of the LPC 44 and the LPT 46 to render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In another non-limiting example, the bypass ratio of the gas turbine engine 20 is greater than about ten (10:1), the fan diameter is significantly larger than that of the LPC 44, and the LPT 46 has a pressure ratio greater than about five (5:1). It should be appreciated, however, that the above parameters are only exemplary of a geared architecture engine and that the present disclosure is applicable to other gas turbine engines including direct drive turbofans.

In an example high-bypass turbofan embodiment, significant thrust is provided by the bypass flow path due to the high bypass ratio as the fan section 22 may be designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a fan blade of the fan section 22 without the use of a Fan Exit Guide Vane system. The low Fan Pressure Ratio according to one example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to the example gas turbine engine 20 is less than about 1150 fps (351 m/s).

Figure 3:
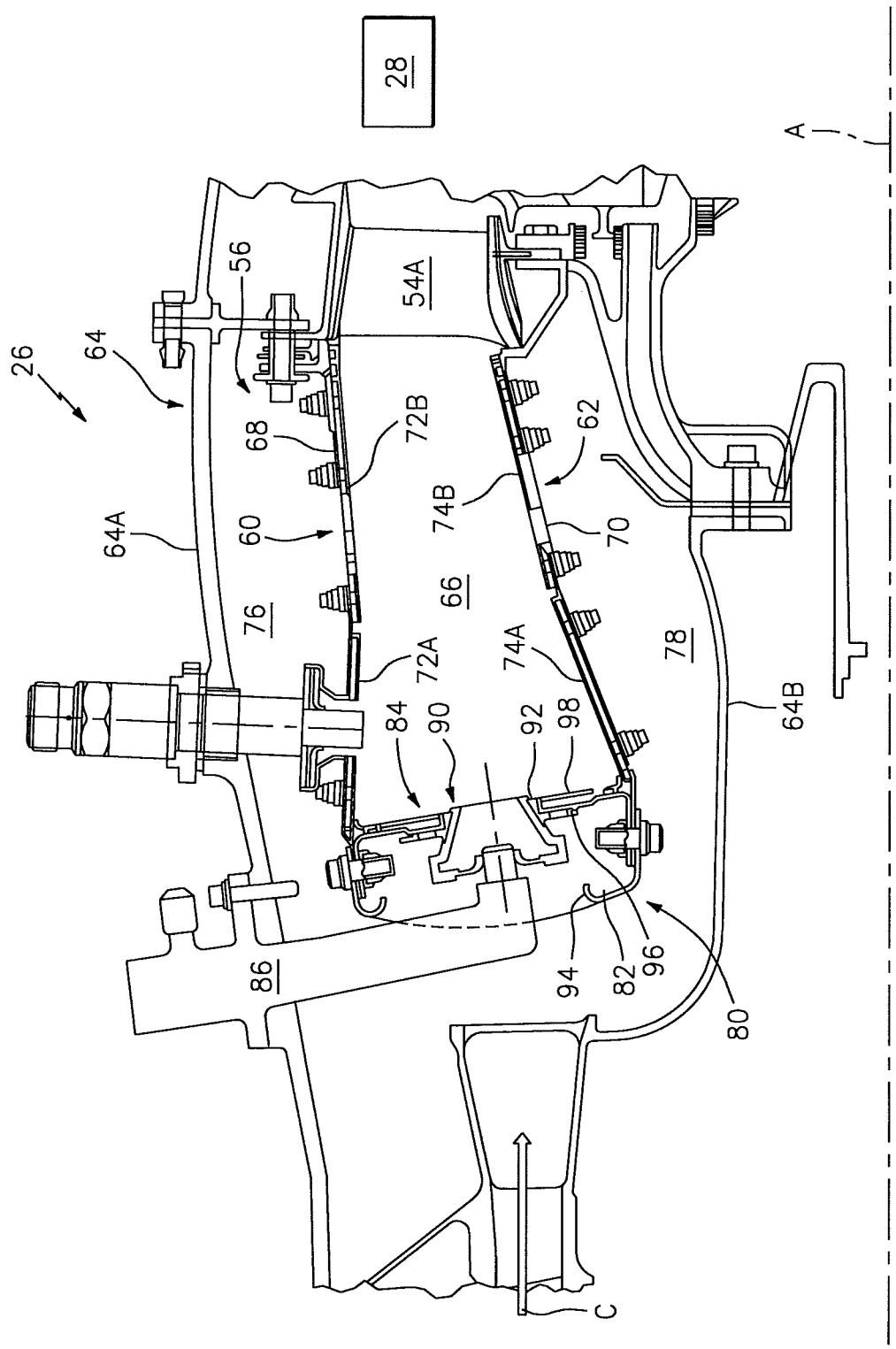
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor wall and diffuser case module arrangements will also benefit herefrom.

The combustor wall assemblies 60, 62 contain the combustion products for direction toward the turbine section 28. Each combustor wall assembly 60, 62 generally includes a respective support shell 68, 70 which supports one or more liner panels 72, 74 mounted within the respective support shell 68, 70. Each of the liner panels 72, 74 may be generally rectilinear with a circumferential arc and/or may be manufactured of, for example, a nickel based super alloy, ceramic or other temperature resistant material and are arranged to faun a liner array. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes an annular hood 82 and a bulkhead assembly 84 that support a multiple of fuel nozzles 86 (one shown) and a multiple of swirlers 90 (one shown). The annular hood 82 extends radially between, and is secured to, the forwardmost ends of the combustor wall assemblies 60, 62. The annular hood 82 includes a multiple of circumferentially distributed hood ports 94 that accommodate the respective fuel nozzle 86 and introduce air into the forward end of the combustion chamber 66 through a respective swirler 90. The bulkhead assembly 84 includes a bulkhead support shell 96 secured to the combustor wall assemblies 60, 62, and a multiple of circumferentially distributed bulkhead liner panels 98 secured to the bulkhead support shell 96. Each fuel nozzle 86 may be secured to the diffuser case module 64 and project through one of the hood ports 94 and respective swirlers 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a fuel-air mixture that supports stable combustion in the combustion chamber 66.

Opposite the forward assembly 80, the outer and the inner support shells 68, 70 are mounted to a first row of Nozzle Guide Vanes (NGVs) 54A in the HPT 54. The NGVs 54A are static engine components which direct core airflow combustion gases onto turbine blades in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation.

Figure 4:
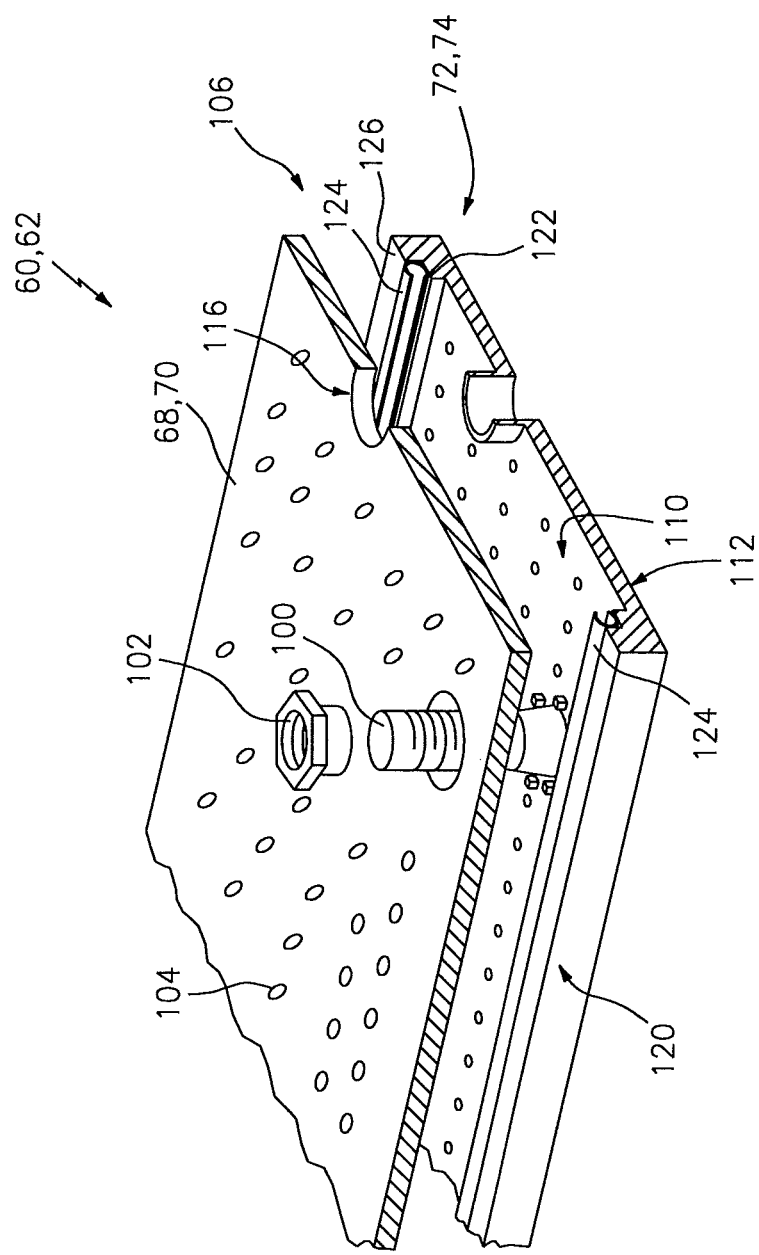
FIG. 4 is an expanded exploded view of a combustor wall assembly.
Figure 5:
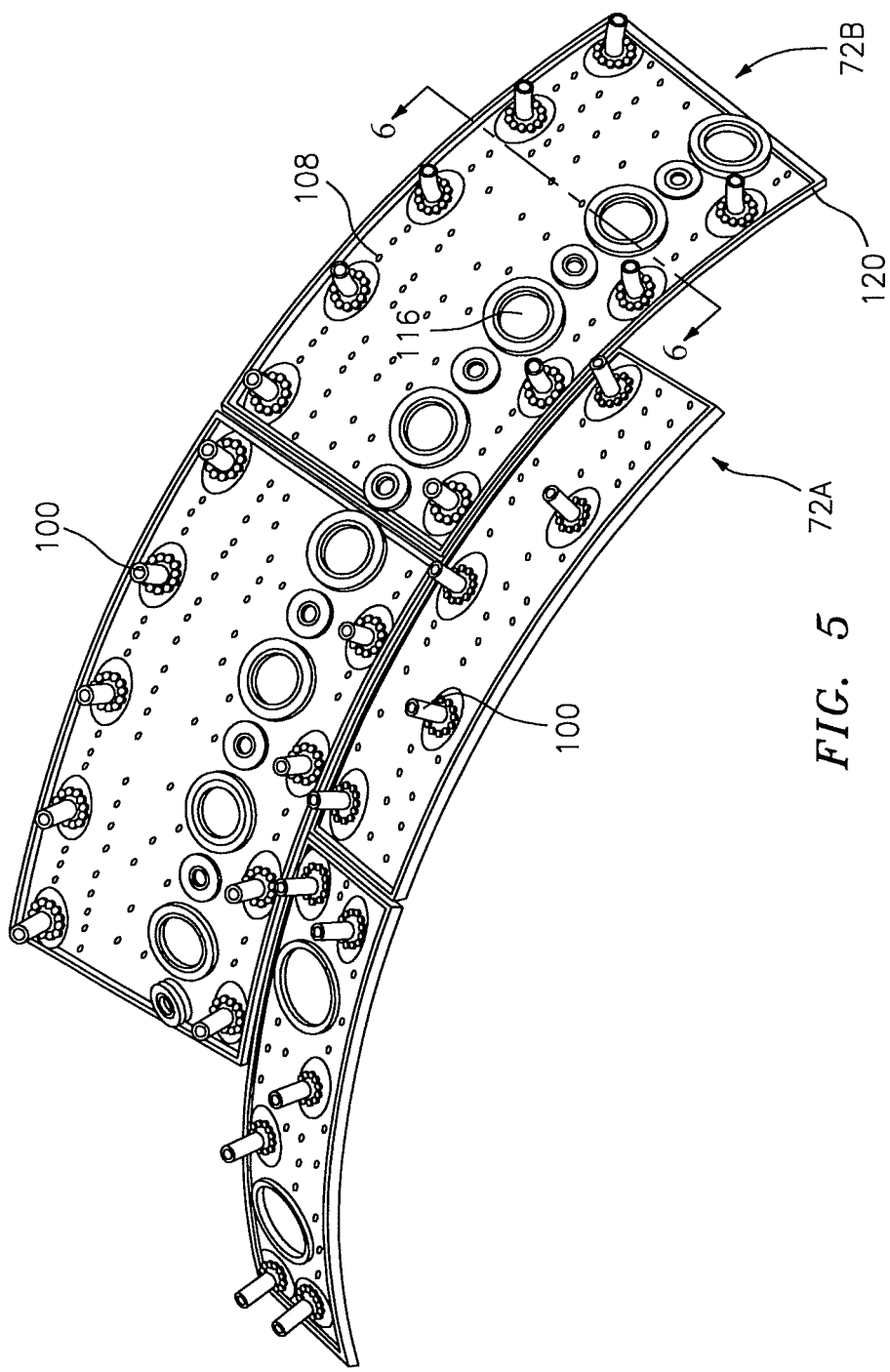
FIG. 5 is a perspective view of a portion of an outer liner panel array.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 through the respective support shells 68, 70 to receive the fasteners 102 at a threaded distal end section thereof to define one or more impingement cavities 106. The liner panels 72, 74 typically include one or more rails 120 which extend from extend from a cold side 110 thereof. The rail 120 extends around the periphery of the cold side 110 (see FIG. 5) to interface with their respective support shells 68, 70 when mounted thereto to define one or more impingement cavities 106 (see also FIG. 7). That is, the rails 120 at least extend around the cold side 110 periphery and may include further internal rails to define additional compartments.

A multiple of cooling impingement passages 104 penetrate through the support shells 68, 70 to allow air from the respective annular plenums 76, 78 to enter impingement cavities 106 formed within the combustor wall assemblies 60, 62 between the respective support shells 68, 70 and the liner panels 72, 74. The cooling impingement passages 104 are generally normal to the surface of the liner panels 72, 74. The air in the cavities 106 provides cold side impingement cooling of the liner panels 72, 74 that is generally defined herein as heat removal via internal convection.

A multiple of effusion passages 108 (see FIG. 5) penetrate through each of the liner panels 72, 74. The geometry of the passages (e.g., diameter, shape, density, surface angle, incidence angle, etc.) as well as the location of the passages with respect to the high temperature combustion gas flow also contributes to effusion film cooling. The combination of impingement passages 104 and effusion passages 108 may be referred to as an Impingement Film Floatwall (IFF) assembly.

The effusion passages 108 allow the air to pass from each cavity 106 defined in part by the cold side 110 of the liner panels 72, 74 to a hot side 112 thereof to facilitate the formation of a relatively thin, cool, insulating blanket of cooling air along the hot side 112. The effusion passages 108 are generally more numerous than the impingement passages 104 to promote the development of a sheath of film cooling along the hot side 112. Film cooling as defined herein is the introduction of a relatively cooler air at one or more discrete locations along a surface exposed to a high temperature environment to protect that surface in the region of the air injection as well as downstream thereof.

Figure 6:
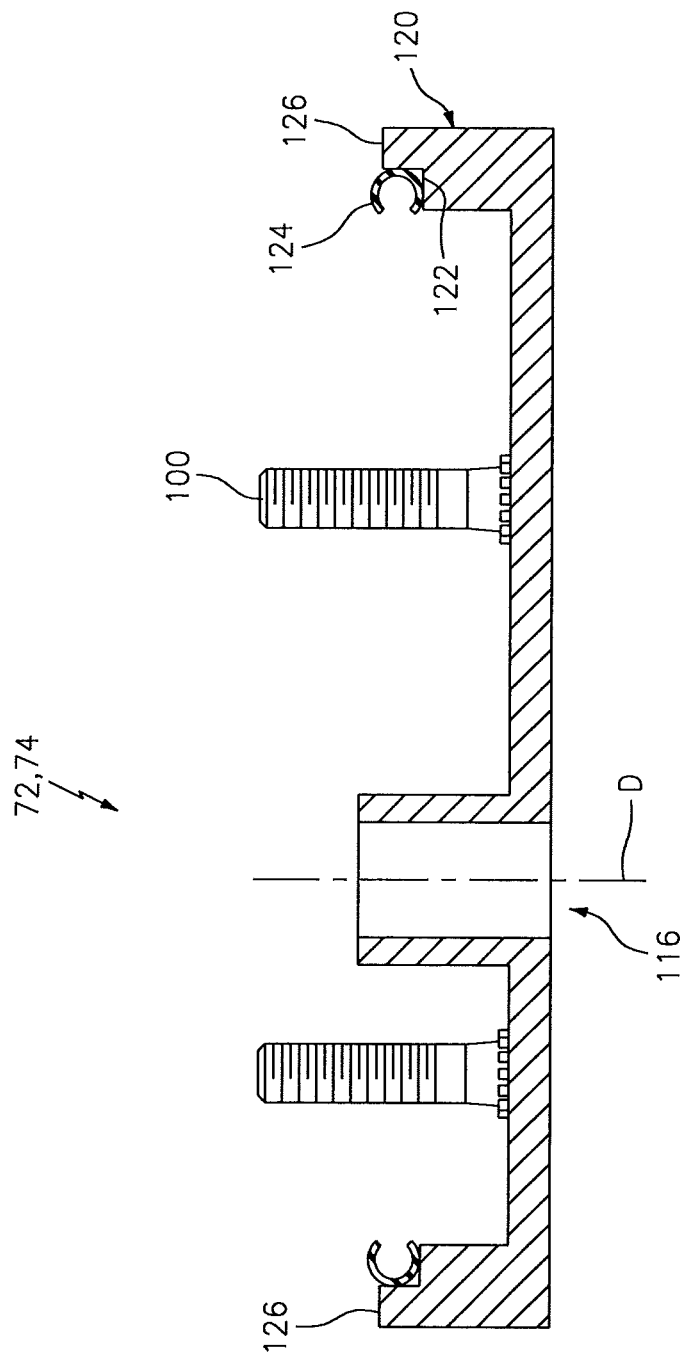
FIG. 6 is a sectional view of a liner panel with a seal according to one disclosed non-limiting embodiment.

A multiple of dilution passages 116 may penetrate through both the respective support shells 68, 70 and the liner panels 72, 74 along a common axis D (see FIG. 6). For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Some engine cycles and architectures demand that the gas turbine engine combustor 56 operate at relatively high compressor exit pressures aft of the HPC 52—referred to herein as P3. As further perspective, P1 is a pressure in front of the fan section 22; P2 is a pressure at the leading edge of the fan 42; P2.5 is the pressure between the LPC 44 and the HPC 52; P3 is the pressure aft of the HPC 52 within the diffuser case module; P4 is the pressure aft of the combustion chamber 66 adjacent the NGVs; P4.5 is the pressure between the HPT 54 and the LPT 46; and P5 is the pressure aft of the LPT 46 (see FIGS. 1 and 2). These engine cycles and architectures also result in a further requirement that the HPC 52 pressures exist in concert with a cooling air supply pressure decrease at higher altitudes. That is, available pressures may not be sufficient for cooling requirements at high altitudes as the heat transfer capability of the liner panels 72, 74 decrease by a factor of about two (2) as supply pressures decreases from, for example, sea level flight operations to higher altitude flight operations.

Each rail 120 includes a notch 122 to receive a seal 124 (also shown in FIG. 6). It should be appreciated that the "notch" as defined herein includes various recesses, grooves, marks, cuts, and other surfaces for the seal 124. In this disclosed non-limiting embodiment, the notch 122 is a generally L-shaped cut out on the impingement cavity 106 side of the rail 120. The notch 122 in the rail 120 surrounds the impingement cavity 106 and is recessed with respect to a rail surface 126 of the rail 120. That is, the interface surfaces 126 contact the respective support shells 68, 70 to form a rail seal interface 128 (see FIG. 7).

Figure 7:
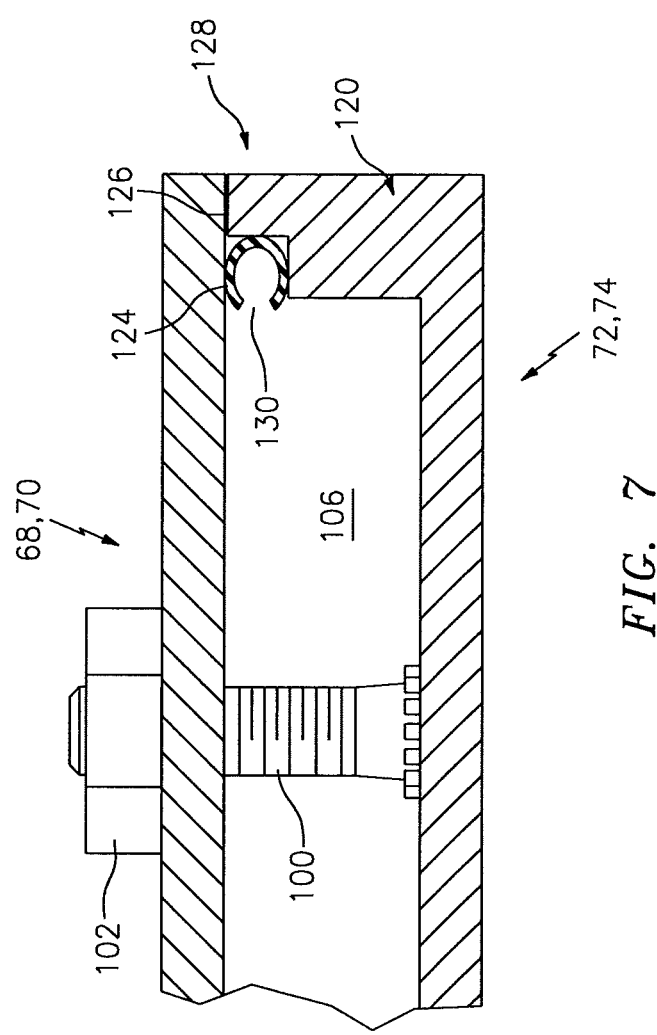
FIG. 7 is a partial sectional view of the combustor wall assembly with the seal installed therein.

With reference to FIG. 7, the seal 124 in this disclosed non-limiting embodiment is a C-shaped seal with an opening 130 thereof directed toward the impingement cavity 106. The seal 124 may be manufactured of, for example, a 625 nickel alloy material.

As the fasteners 102 are secured to the studs 100 and the liner panels 72, 74 are pulled toward their respective support shells 68, 70, the rail seal interface 128 contacts the respective support shells 68, 70 and the seal 124 is at least partially compressed. The seal 124 thereby facilitates sealing of the impingement cavity 106 in addition to the face contact interface at the rail interface surface 126. Furthermore, as the opening 130 is directed toward the impingement cavity 106, the pressure within the impingement cavity 106 serves to open the C-shaped seal and facilitate the sealing interface 128. That is, a relatively higher pressure resistant seal interface 128 is formed to minimize leakage from each impingement cavity 106.

The seal 124 may be brazed or otherwise affixed at least partially within the notch 122. Alternatively, the seal 124 may be interference fit within the notch 122 as a single continuous seal 124 may surround the periphery of each impingement cavity 106.

The seal 124 facilitates an increased pressure drop across the combustor 56. In one disclosed non-limiting embodiment, the pressure within the impingement cavities 106 is about equal to a pressure within the diffuser case module 64. That is, the pressure drop is approximately 50-50 or higher as compared to a more conventional 80-20 pressure drop with but a face rail contact interface alone. In other words, 80% of the conventional pressure drop is utilized for impingement flow while 20% is utilized for effusion flow. In this disclosed non-limiting embodiment, seal 124 facilitates a pressure drop across the support shell 68, 70 of less than about 80% and a pressure drop across the liner panels 72, 74 greater than about 20%. Testing has shown that the more aggressive (50-50 or higher) pressure drop split effectively increases panel cooling.

The seal 124 readily controls leakage around the liner panels 72, 74 facilitate formation of a relatively larger pressure drops across the liner panels 72, 74 to increase cooling effectiveness.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor of a gas turbine engine, the combustor comprising:
   a shell comprising a multiple of cooling impingement passages;
   a liner panel mounted to the shell, the liner panel comprising:
   a cold side facing the shell and a hot side opposite the cold side and facing away from the shell;
   a rail extending around a periphery of the cold side of the liner panel and in contact with the shell along a rail surface of the rail so as to define an impingement cavity between the liner panel and the shell, the rail comprising a notch which faces toward the impingement cavity; and
   a multiple of effusion passages extending through the liner panel between the cold side and the hot side; and
   a seal disposed within the notch and surrounding the impingement cavity, wherein the seal is a C-seal;
   wherein an opening of the C-seal is directed toward the impingement cavity; and
   wherein the multiple of effusion passages are more numerous than the multiple of cooling impingement passages.

2. The combustor as recited in claim 1, further comprising a multiple of studs extending from the cold side of the liner panel.

3. The combustor as recited in claim 1, wherein the combustor is configured so that air directed through the shell and the liner panel forms a pressure drop across the shell that is less than about 80% and greater than about 50% of a pressure drop across the combustor and a pressure drop across the liner panel that is greater than about 20% and less than about 50% of the pressure drop across the combustor.

4. A combustor of a gas turbine engine, the combustor comprising:
   a shell comprising a multiple of impingement flow passages;
   a liner panel mounted to the shell, the liner panel comprising:
   a cold side facing the shell and a hot side opposite the cold side and facing away from the shell;
   a rail extending around a periphery of the cold side of the liner panel and in contact with the shell along a rail surface of the rail which interfaces with the shell to define an impingement cavity between the liner panel and the shell, and the rail including a notch which faces toward the impingement cavity; and
   a multiple of effusion passages extending through the liner panel between the cold side and the hot side; and
   a seal disposed within the notch and surrounding the impingement cavity, wherein the seal is a C-seal;
   wherein an opening of the C-seal is directed toward the impingement cavity;
   wherein a dilution passages penetrates through both the shell and the liner panel along a common axis; and
   wherein the multiple of effusion passages are more numerous than the multiple of cooling impingement passages.

5. The combustor as recited in claim 4, further comprising a plurality of studs extending from the cold side of the liner panel, the studs extending through the shell.

6. A method of cooling a wall assembly within a combustor of a gas turbine engine, the method comprising:

directing aft through a support shell and a liner panel to form a pressure drop across the support shell that is less than about 80% of a pressure drop across the combustor and to further form a pressure drop across the liner panel greater than about 20% of the pressure drop across the combustor;

the combustor comprising a shell comprising a multiple of cooling impingement passages; the liner panel mounted to the shell, the liner panel comprising:

a cold side facing the shell and a hot side opposite the cold side and facing away from the shell;

a rail extending around a periphery of the cold side of the liner panel and in contact with the shell along a rail surface of the rail so as to define an impingement cavity between the liner panel and the shell, the rail comprising a notch which faces toward the impingement cavity; and a multiple of effusion passages extending through the liner panel between the cold side and the hot side; and a seal disposed within the notch and surrounding the impingement cavity, wherein the seal is a C-seal;

wherein an opening of the C-seal is directed toward the impingement cavity; and wherein the multiple of effusion passages are more numerous than the multiple of cooling impingement passages.

7. The method as recited in claim 6, further comprising sealing an interface between the support shell and at least the liner panel of a multiple of liner panels.

8. The method as recited in claim 7, further comprising compressing the C-seal between the support shell and the liner panel of the multiple of liner panels.

9. The method as recited in claim 7, further comprising pressurizing the C-seal.

* * * * *